(12) United States Patent
Yamada

(10) Patent No.: US 7,013,381 B2
(45) Date of Patent: Mar. 14, 2006

(54) FUNCTION-VARIABLE TYPE DIGITAL SIGNAL PROCESSING APPARATUS, AND METHOD OF AND PROGRAM FOR CONTROLLING THE SAME

(75) Inventor: Katsushi Yamada, Kanagawa-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 480 days.

(21) Appl. No.: 10/315,834

(22) Filed: Dec. 10, 2002

(65) Prior Publication Data

US 2003/0140215 A1 Jul. 24, 2003

(30) Foreign Application Priority Data

Jan. 21, 2002 (JP) ............................. 2002-012029

(51) Int. Cl.
*G06F 15/163* (2006.01)
*G06F 15/76* (2006.01)

(52) U.S. Cl. .......................................... 712/35; 712/36

(58) Field of Classification Search .................. 712/35, 712/36
See application file for complete search history.

(56) References Cited

U.S. PATENT DOCUMENTS

| 5,376,752 | A | * | 12/1994 | Limberis et al. ............... 84/622 |
| 6,088,785 | A | * | 7/2000 | Hudson et al. ................ 712/35 |
| 6,158,018 | A | * | 12/2000 | Bernasconi et al. ........... 714/8 |
| 6,725,357 | B1 | * | 4/2004 | Cousin ......................... 712/214 |
| 2002/0040429 | A1 | * | 4/2002 | Dowling ..................... 712/228 |

FOREIGN PATENT DOCUMENTS

| JP | 407302195 A | * | 11/1995 |
| JP | 08-069305 | | 3/1996 |
| JP | 2001-209575 | | 8/2001 |

* cited by examiner

*Primary Examiner*—Daniel H. Pan
(74) *Attorney, Agent, or Firm*—Pearne & Gordon LLP

(57) ABSTRACT

Herein disclosed is a function-variable type DSP apparatus comprising: a storage section for storing a plurality of DSP microprogram parts; and a plurality of DSP executing sections each for executing the DSP microprogram parts to implement a DSP function, each of the DSP microprogram parts being executable by each of the DSP executing sections to perform a set of steps necessary to implement a DSP base function forming part of a DSP function, whereby the DSP executing sections are operative to receive the DSP microprogram parts simultaneously from the storage section, and selectively execute the DSP microprogram parts in a sequence to respectively implement desired DSP functions.

8 Claims, 8 Drawing Sheets

FIG. 2

| Call Instruction | An address of a subroutine to be called |
|---|---|

F I G. 3
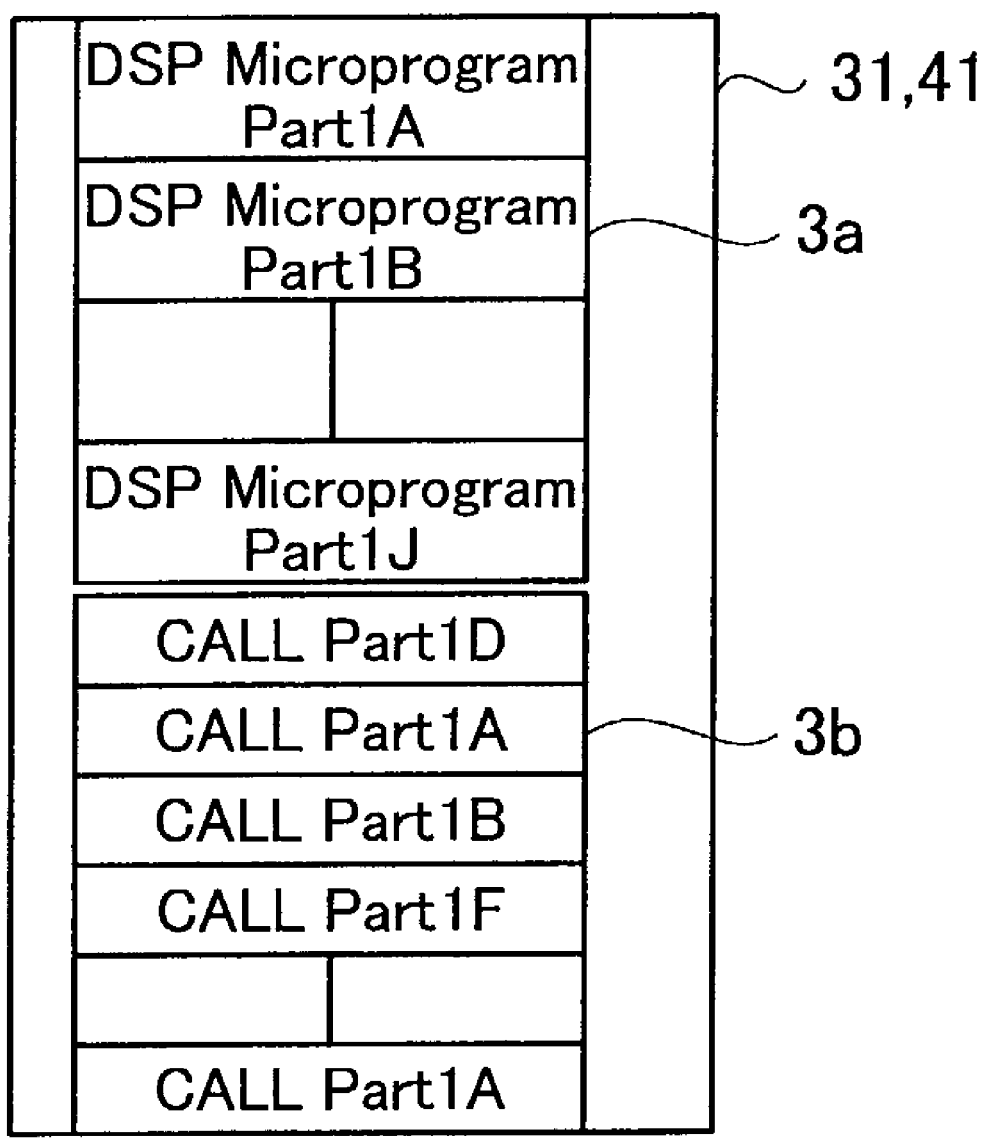

F I G. 7
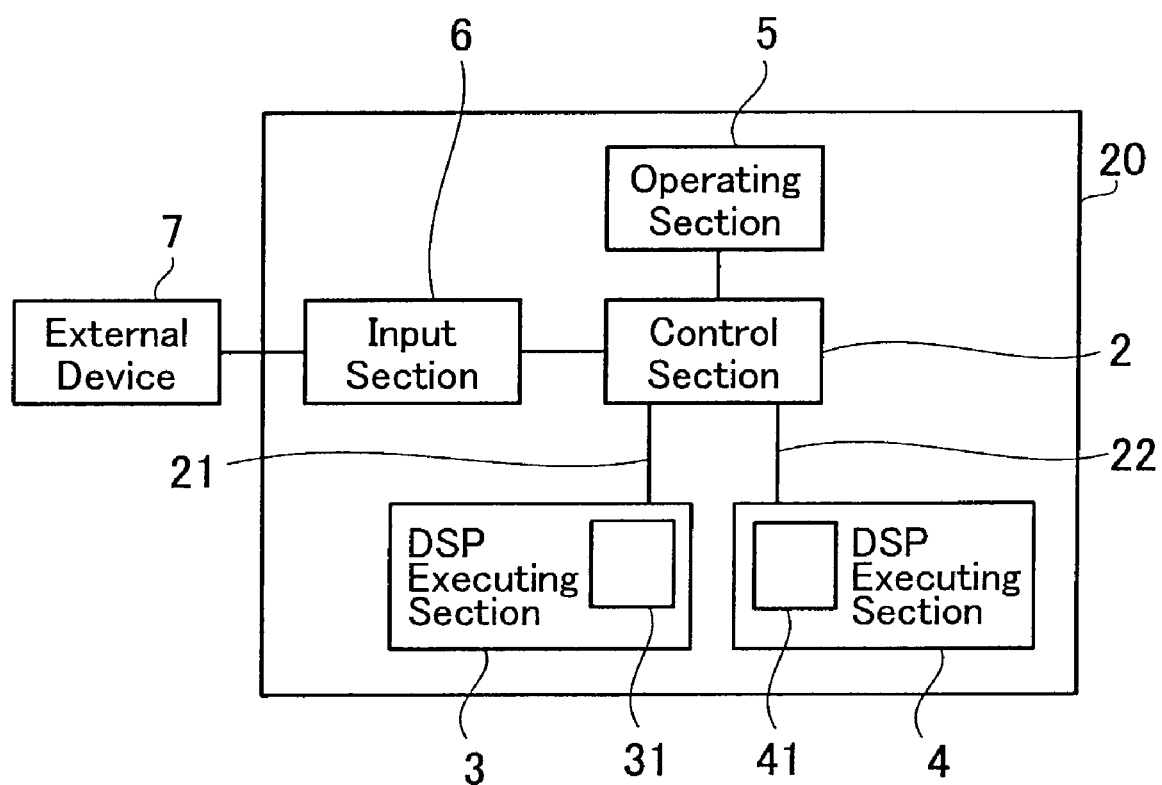

FUNCTION-VARIABLE TYPE DIGITAL SIGNAL PROCESSING APPARATUS, AND METHOD OF AND PROGRAM FOR CONTROLLING THE SAME

BACKGROUND OF THE INVENTION

1. Field of the Invention

The present invention relates to a function-variable type digital signal processing apparatus for, method of, and computer program product for performing a digital signal processing used for, for example, an audio mixing console and a signal processor.

2. Description of the Related Art

Up until now, there have been proposed a wide variety of digital signal processing apparatuses capable of performing digital signal processing to, for example, analog sound signals, thereby enabling to reduce the cost and the size of, and provide multiple functions to an audio mixer such as, for example, an audio mixing console, and a signal processor such as, for example, a voice control device.

One of the conventional digital signal processing apparatus of this type is disclosed in the Japanese Patent No. 3171361. The digital signal processing will be hereinlater simply referred to as "DSP". The conventional DSP apparatus is shown in FIG. 9 as comprising: a DSP programming device 8 and a DSP device 9. For simplicity and better understanding, the schematic representation of FIG. 9 shows a conventional DSP apparatus comprising only one DSP device 9, but of course needless to mention that the conventional DSP apparatus may comprise a plurality of DSP devices 9.

The DSP programming device 8 has a DSP microprogram storage area. The DSP programming device 8 is operative to store a plurality of DSP microprogram parts in the DSP microprogram storage area. The DSP programming device 8 is then operative to assemble all the DSP microprogram parts stored in the DSP microprogram storage area to create a DSP microprogram to be transferred to the DSP device 9. The DSP device 9 is operative to receive the DSP microprogram from the DSP programming device 8. The DSP device 9 is then operative to initialize itself in response to, and execute the DSP microprogram thus received to implement a desired DSP function. More specifically, the DSP microprogram includes all the DSP microprogram parts stored in the DSP microprogram storage area. Each of the DSP microprogram parts corresponds to a digital signal processing algorithm executable by the DSP device 9 to perform a set of steps necessary to implement a DSP base function forming part of the desired DSP function. The DSP microprogram thus created by the DSP programming device 8 is executable by the DSP device 9 to implement the desired DSP function. This means that the DSP device 9 is required to receive a DSP microprogram including all of the DSP microprogram parts from the DSP programming device 8 before implementing a desired DSP function.

Furthermore, a modification may be made to the DSP microprogram parts to be performed by the DSP device 9 so as to change a DSP function which the DSP device 9 implements to a specified DSP function. For any modification to be made to the DSP microprogram parts constituting the DSP microprogram, the DSP programming device 8 should assemble all of the DSP microprogram parts again to create a modified DSP microprogram to be transferred to the DSP device 9. Subsequently, the DSP device 9 should receive the modified DSP microprogram including all of the DSP microprogram parts from the DSP programming device, initialize itself in response to, and execute the DSP microprogram thus received to implement the specified DSP function.

The conventional DSP apparatus, however, encounters a drawback that the conventional DSP apparatus comprising a plurality of DSP devices 9, in which the DSP programming device 8 is operative to transfer a plurality of DSP microprograms respectively to a plurality of DSP devices 9, and all of the DSP devices 9 are operative to receive the DSP microprograms respectively transferred from the DSP programming device 8, and initialize themselves in response to the DSP microprograms thus received before implementing the desired DSP functions, gives rise to needs that the DSP programming device 8 should transfer a plurality of DSP microprograms respectively to a plurality of DSP devices 9, and all of the DSP devices 9 should receive the DSP microprograms respectively from the DSP programming device 8, and initialize themselves in response to the DSP microprograms thus received before implementing the desired DSP functions, thereby consuming a large amount of time and operation before the DSP devices 9 implement the desired DSP functions.

Furthermore, the conventional DSP apparatus encounters another drawback that any minor modification to, for example, a single DSP microprogram part gives rise to needs that the DSP programming device 8 should assemble all of the DSP microprogram parts again to create a modified DSP microprogram to be transferred to the DSP device 9, and the DSP device 9 should receive the modified DSP microprogram including all of the DSP microprogram parts from the DSP programming device 8, and then initialize itself again in response to the modified DSP microprogram thus received before implementing specified DSP functions, thereby consuming a considerable amount of time and operation. Assuming that a DSP microprogram consists of, for example, 10 units of the DSP microprogram parts, a modification to, for example, a single DSP microprogram part gives rise to needs that the DSP programming device 8 should assemble 10 units of the DSP microprogram parts again to create a modified DSP microprogram to be transferred to the DSP device 9, and the DSP devices 9 should receive the modified DSP microprogram including 10 units of the DSP microprogram parts from the DSP programming device 8, and initialize itself again in response to the modified DSP microprogram thus received, thereby consuming a considerable amount of time and operation before the DSP device 9 implements the specified DSP function. The present invention contemplates resolution of such problems.

SUMMARY OF THE INVENTION

It is therefore an object of the present invention to provide a function-variable type DSP apparatus, which can reduce a time required for the DSP devices to receive the DSP microprograms respectively from the DSP programming device and initialize themselves in response to the DSP microprograms thus received, thereby shortening a time to be elapsed before the DSP devices implement the desired DSP functions.

It is another object of the present invention to provide a function-variable type DSP apparatus, which can eliminate the need that the DSP programming device should assemble all of the DSP microprogram parts again to create a modified DSP microprogram to be transferred to the DSP device, and the DSP device should receive the modified DSP microprogram including all of the DSP microprogram parts from the DSP programing device whenever any modification is made to the DSP microprogram parts, thereby shortening a time to be elapsed before the DSP device implements the desired DSP functions.

It is a further object of the present invention to provide a function-variable type DSP method, which can reduce a time required for the DSP devices to receive the DSP microprograms respectively from the DSP programming device and initialize themselves in response to the DSP microprograms thus received, thereby shortening a time to be elapsed before the DSP devices implement the desired DSP functions.

It is a still further object of the present invention to provide a function-variable type DSP method, which can eliminate the need that the DSP programming device should assemble all of the DSP microprogram parts again to create a modified DSP microprogram to be transferred to the DSP device, and the DSP device should receive the modified DSP microprogram including all of the DSP microprogram parts from the DSP programming device whenever any modification is made to the DSP microprogram parts, thereby shortening a time to be elapsed before the DSP device implements the desired DSP functions.

It is a yet further object of the present invention to provide a function-variable type DSP computer program product, which can reduce a time required for the DSP devices to receive the DSP microprograms respectively from the DSP programming device and initialize themselves in response to the DSP microprograms thus received, thereby shortening a time to be elapsed before the DSP devices implement the desired DSP functions.

It is a yet further object of the present invention to provide a function-variable type DSP computer program product, which can eliminate the need that the DSP programming device should assemble all of the DSP microprogram parts again to create a modified DSP microprogram to be transferred to the DSP device, and the DSP device should receive the modified DSP microprogram including all of the DSP microprogram parts from the DSP programming device whenever any modification is made to the DSP microprogram parts, thereby shortening a time to be elapsed before the DSP device implements the desired DSP functions.

In accordance with a first aspect of the present invention, there is provided a storage section for storing a plurality of DSP microprogram parts; and a plurality of DSP executing sections each for executing the DSP microprogram parts to implement a DSP function, each of the DSP microprogram parts being executable by each of the DSP executing sections to perform a set of steps necessary to implement a DSP base function forming part of a DSP function, whereby the DSP executing sections are operative to receive the DSP microprogram parts simultaneously from the storage section, and selectively execute the DSP microprogram parts in a sequence to respectively implement desired DSP functions.

The aforesaid function-variable type DSP apparatus may comprise: a storage section for storing a plurality of DSP microprogram parts; a plurality of DSP executing sections each for executing the DSP microprogram parts to implement a DSP function, each of the DSP microprogram parts being executable by each of the DSP executing sections to perform a set of steps necessary to implement a DSP base function forming part of a DSP function; and a control section for receiving the DSP microprogram parts from the storage section, and transferring the DSP microprogram parts simultaneously to the DSP executing sections. The DSP executing sections have respectively program storage areas, and are operative to receive the DSP microprogram parts simultaneously from the control section, store the DSP microprogram parts in the program storage areas, and selectively execute the DSP microprogram parts stored in the program storage areas in a sequence to respectively implement desired DSP functions.

The aforesaid function-variable type DSP apparatus may further comprise: an operating section for inputting an operational instruction, in which the control section is operative to receive the operational instruction from the operating section, generate call statements in a sequence each indicative of an instruction to call one of the DSP microprogram parts in accordance with the operational instruction, and transfer the call statements to the DSP executing sections. The DSP executing sections are operative to receive the call statements from the control section, and selectively execute the DSP microprogram parts stored in the program storage areas in a sequence in response to the call statements in a sequence to respectively implement desired DSP functions.

In accordance with a second aspect of the present invention, there is provided a function-variable type DSP apparatus comprising: an input section for inputting a plurality of DSP microprogram parts; and a plurality of DSP executing sections each for executing the DSP microprogram parts to implement a DSP function, each of the DSP microprogram parts being executable by each of the DSP executing sections to perform a set of steps necessary to implement a DSP base function forming part of a DSP function, whereby the DSP executing sections are operative to receive the DSP microprogram parts simultaneously from the input section, and selectively execute the DSP microprogram parts in a sequence to respectively implement desired DSP functions.

In the aforesaid function-variable type DSP apparatus, each of the DSP microprograms may correspond to an address, the operating section is operative to input a modified operational instruction indicative of DSP microprogram parts to be executed by the DSP executing sections in a sequence, the control section is operative to receive the modified operational instruction inputted by the operating section, determine one or more addresses respectively corresponding to the DSP microprogram parts to be modified in accordance with the modified operational instruction inputted by the operating section, generate the call statements in a sequence each indicative of an instruction to call one of the DSP microprogram parts indicated by the address, and transfer the call statements to the DSP executing sections. The DSP executing sections are operative to receive the call statements from the control section, and selectively execute the DSP microprogram parts stored in the program storage areas in a sequence in response to the call statements in a sequence to respectively implement desired DSP functions.

9. In the function-variable type DSP apparatus, the input section may serve as the operating section.

In accordance with a third aspect of the present invention, there is provided a function-variable type DSP method comprising: a step (a) of storing a plurality of DSP microprogram parts in a storage section; and a plurality of steps (b-1 to b-n) each executing the DSP microprogram parts to implement a DSP function, each of the DSP microprogram parts being executable by each of the steps (b-1 to b-n) to perform a set of steps necessary to implement a DSP base function forming part of a DSP function. The aforesaid steps (b-1 to b-n) have respectively steps of receiving the DSP microprogram parts simultaneously from the storage section, and selectively executing the DSP microprogram parts in a sequence to respectively implement desired DSP functions.

The aforesaid function-variable type DSP method may comprise: a step (a) of storing a plurality of DSP microprogram parts in a storage section; a plurality of steps (b-1 to b-n) each executing the DSP microprogram parts to implement a DSP function, each of the DSP microprogram parts being executable by each of the steps (b-1 to b-n) to perform a set of steps necessary to implement a DSP base function forming part of a DSP function; and a step (c) of receiving the DSP microprogram parts from the storage section, and transferring the DSP microprogram parts simultaneously to the steps (b-1 to b-n). The aforesaid steps (b-1 to b-n) have respectively steps of receiving the DSP microprogram parts simultaneously transferred in the step (c), storing the DSP microprogram parts in respective program storage areas, and selectively executing the DSP microprogram parts stored in the program storage areas in a sequence to respectively implement desired DSP functions.

In accordance with a fourth aspect of the present invention, there is provided a function-variable type DSP method comprising: a step (e) of inputting a plurality of DSP microprogram parts; and a plurality of steps (b-1 to b-n) each executing the DSP microprogram parts to implement a DSP function, each of the DSP microprogram parts being executable by each of the steps (b-1 to b-n) to perform a set of steps necessary to implement a DSP base function forming part of a DSP function. The aforesaid steps (b-1 to b-n) have respectively steps of simultaneously receiving the DSP microprogram parts inputted in the step (e), and selectively executing the DSP microprogram parts in a sequence to respectively implement desired DSP functions.

Each of the DSP microprograms may correspond to an address, the step (d) has a step of inputting a modified operational instruction indicative of DSP microprogram parts to be executed in the steps (b-1 to b-n) in a sequence, and the step (c) has a step of receiving the modified operational instruction inputted in the step (d), determining one or more addresses respectively corresponding to the DSP microprogram parts to be modified in accordance with the modified operational instruction inputted in the step (d), generating the call statements in a sequence each indicative of an instruction to call one of the DSP microprogram parts indicated by the address, and transferring the call statements to the steps (b-1 to b-n). The steps (b-1 to b-n) may have respectively steps of receiving the call statements transferred in the step (c), and selectively executing the DSP microprogram parts stored in the program storage areas in a sequence in response to the call statements in a sequence to respectively implement desired DSP functions.

In accordance with a fifth aspect of the present invention, there is provided a function-variable type DSP computer program product comprising a computer usable storage medium having computer readable code embodied therein, the computer readable code comprising: a computer readable program code (a) for storing a plurality of DSP microprogram parts in a storage section; and a plurality of computer readable program codes (b-1 to b-n) each for executing the DSP microprogram parts to implement a DSP function, each of the DSP microprogram parts being executable by each of the computer readable program code (b-1 to b-n) to perform a set of steps necessary to implement a DSP base function forming part of a DSP function. The computer readable program codes (b-1 to b-n) may have respectively computer readable program codes for receiving the DSP microprogram parts simultaneously from the storage section, and selectively executing the DSP microprogram parts in a sequence to respectively implement desired DSP functions.

The aforesaid function-variable type DSP computer program product may further comprise: a computer readable program code (d) for inputting an operational instruction. The computer readable program code (c) may have a computer readable program code for receiving the operational instruction inputted by the computer readable program code (d), generating call statements in a sequence each indicative of an instruction to call one of the DSP microprogram parts in accordance with the operational instruction, and transfer the call statements to the computer readable program codes (b-1 to b-n). The computer readable program codes (b-1 to b-n) may have respectively computer readable program codes for receiving the call statements transferred by the computer readable program code (c), and selectively executing the DSP microprogram parts stored in the program storage areas in a sequence in response to the call statements in a sequence to respectively implement desired DSP functions.

In accordance with a sixth aspect of the present invention, there is provided a function-variable type DSP computer program product comprising: a computer readable program code (e) for inputting a plurality of DSP microprogram parts; and a plurality of computer readable program codes (b-1 to b-n) each for executing the DSP microprogram parts to implement a DSP function, each of the DSP microprogram parts being executable by each of the computer readable program codes (b-1 to b-n) to perform a set of steps necessary to implement a DSP base function forming part of a DSP function. The aforesaid computer readable program codes (b-1 to b-n) may have respectively computer readable program codes for simultaneously receiving the DSP microprogram parts inputted by the computer readable program code (e), and selectively executing the DSP microprogram parts in a sequence to respectively implement desired DSP functions.

In accordance with a seventh aspect of the present invention, there is provided a function-variable type DSP computer program product comprising: a computer readable program code (e) for inputting a plurality of DSP microprogram parts; a plurality of computer readable program codes (b-1 to b-n) each for executing the DSP microprogram parts to implement a DSP function, each of the DSP microprogram parts being executable by each of the computer readable program codes (b-1 to b-n) to perform a set of steps necessary to implement a DSP base function forming part of a DSP function; and a computer readable program code (c) for receiving the DSP microprogram parts inputted by the computer readable program code (e), and transferring the DSP microprogram parts simultaneously to the computer readable program codes (b-1 to b-n). The computer readable program codes (b-1 to b-n) may have respectively computer readable program codes for receiving the DSP microprogram parts simultaneously transferred by the computer readable program code (c), storing the DSP microprogram parts in program storage areas, and selectively executing the DSP microprogram parts stored in the program storage areas in a sequence to respectively implement desired DSP functions.

BRIEF DESCRIPTION OF THE DRAWINGS

The present invention and many of the advantages thereof will be better understood from the following detailed description when considered in connection with the accompanying drawings, wherein:

FIG. 2 is block diagram explaining the structure of a typical call statement microprogram;

FIG. 3 is a block diagram explaining the structure of a program storage area forming part of the function-variable type DSP apparatus shown in FIG. 1;

FIG. 7 is a schematic block diagram showing a second preferred embodiment of the function-variable type DSP apparatus according to the present invention;

DESCRIPTION OF THE PREFERRED EMBODIMENTS

Figure 1:
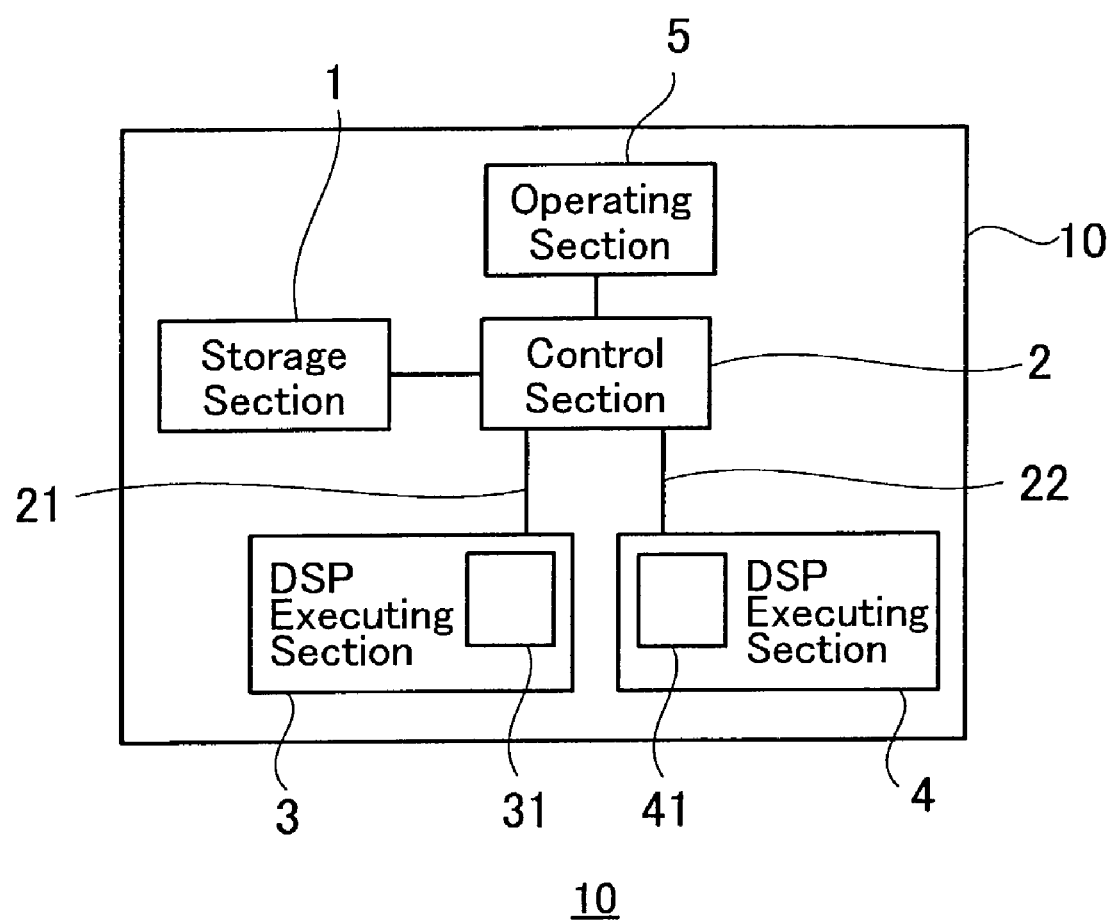
FIG. 1 is a schematic block diagram showing a first preferred embodiment of the function-variable type DSP apparatus according to the present invention.

The preferred embodiments of the function-variable type DSP apparatus according to the present invention will be described hereinafter with reference to the drawings shown in FIGS. 1 to 8. Throughout the following detailed description, similar reference characters refer to similar elements in all figures of the drawings.

Referring now to FIGS. 1 to 6 of the drawings, there is shown a first preferred embodiment of the function-variable type DSP apparatus 10 according to the present invention.

The first preferred embodiment of the function-variable type DSP apparatus 10 is shown in FIG. 1 as comprising a storage section 1, a control section 2, and DSP executing sections 3, 4. The storage section 1 is adapted to store DSP microprogram parts constituting a DSP microprogram. Each of the DSP executing sections 3, 4 is adapted to execute the DSP microprogram, i.e., the DSP microprogram parts to implement a DSP function. Each of the DSP microprogram parts corresponds to a digital signal processing algorithm executable by each of the DSP executing sections 3, 4 to perform a set of steps necessary to implement a DSP base function forming part of a DSP function. The DSP base functions may include, for example, an Infinite Impulse Response filter (IIR) function, a volume control function, and a mixing function. This means that the DSP microprogram parts may include DSP base function microprogram parts such as, for example, an IIR function DSP microprogram part, a volume control function DSP microprogram part, and a mixing function DSP microprogram part, which are executable by each of the DSP executing sections 3, 4 to respectively implement an IIR function, a volume control function, and a mixing function. Furthermore, the DSP base functions may include input-output functions such as, for example, an input-output function between an external device and a voice input section, and an input-output function between the DSP executing sections 3 and 4. This means that the DSP microprogram parts may include input-output function DSP microprogram parts, which are executable by each of the DSP executing sections 3, 4 to respectively implement input-output functions such as an input-output function between an external device and a voice input section, and an input-output function between the DSP executing sections 3 and 4. Each of the DSP microprogram parts is stated as a subroutine program.

The DSP executing sections 3, 4 are operative to receive the DSP microprogram parts simultaneously from the storage section 1, and selectively execute the DSP microprogram parts in a sequence to respectively implement desired DSP functions. Each of the DSP executing sections 3, 4 can selectively execute the DSP microprogram parts in a sequence to selectively implement DSP base functions in the sequence. The DSP base functions thus implemented in the sequence collectively form a DSP function. This means that each of the DSP executing sections 3, 4 can implement a desired DSP function in a manner that each of the DSP executing sections 3, 4 selectively executes the DSP microprogram parts in a sequence so that the DSP base functions collectively forming the desired DSP function are selectively implemented in the sequence.

More specifically, the control section 2 is adapted to receive the DSP microprogram parts from the storage section 1, and transfer the DSP microprogram parts simultaneously to the DSP executing sections 3, 4. The DSP executing sections 3, 4 have respectively program storage areas 31, 41. The DSP executing sections 3, 4 are operative to receive the DSP microprogram parts simultaneously from the control section 2, store the DSP microprogram parts in the program storage areas 31, 41, and selectively execute the DSP microprogram parts stored in the program storage areas 31, 41 in a sequence to respectively implement desired DSP functions. Any modification may be made to the call statement stored in the call statement storage area 3b of the program storage areas 31, 41 so as to change a DSP function which the function-variable type DSP apparatus 10 implements to a specified DSP function, which will be described later.

The function-variable type DSP apparatus 10 according to the present invention may further comprise an operating section 5. The operating section 5 is adapted to input an operational instruction from, for example, an operator. The control section 2 is operative to receive the operational instruction from the operating section 5, generate call statements in a sequence in accordance with the operational instruction thus received, and transfer the call statements thus generated to the DSP executing sections 3, 4. Each of the call statement is made in a form of a microprogram and indicative of an instruction to call one of the DSP microprogram parts. The DSP executing sections 3, 4 are operative to receive the call statements in a sequence from the control section 2, store the call statements in a sequence in the program storage areas 31, 41, and selectively execute the DSP microprogram parts stored in the program storage areas 31, 41 in a sequence in response to the call statements in a sequence stored in the program storage areas 31, 41 to respectively implement desired DSP functions. The structure of a call statement is shown in FIG. 2 as comprising a call instruction and an address of a subroutine to be called. Each of the call statements is indicative of an instruction to call a subroutine program indicated by the address corresponding to one of the DSP microprogram parts. Preferably, each of the DSP microprogram parts may correspond to an address of a subroutine to be called.

The program storage area 31 of the DSP executing section 3 is identical to the program storage area 41 of the DSP executing section 4 in structure. The structure of the program storage area 31, 41 is shown in FIG. 3 as comprising a DSP microprogram part storage area 3a and a call statement storage area 3b. The DSP microprogram part storage area 3a is adapted to store the DSP microprogram parts therein. The DSP microprogram part storage area 3a may have default DSP microprogram parts stored therein, and the call statement storage area 3b may have default call statements stored therein. For simplicity and better understanding, the schematic representation of FIG. 3 shows 10 units of the DSP microprogram parts, i.e., DSP microprogram parts 1A to 1J stored in the DSP microprogram part storage area 3a of the program storage area 31, 41, and 10 units of the call statements stored in the call statement storage area 3b of the program storage area 31, 41, but of course needless to mention that the numbers of DSP microprogram parts and call statements may be any number. Furthermore, the call statements are stored in the program storage area 31, 41 in a sequence. This means that the DSP executing sections 3, 4 are operative to selectively execute the DSP microprogram parts 1A to 1J in a sequence in response to the call statements in a sequence stored in the call statement storage areas 3b of the program storage area 31, 41 to respectively implement desired DSP functions. The control section 2 can modify the call statements in a sequence in accordance with a modified operational instruction, which will be described later.

The operation of the first embodiment of the function-variable type DSP apparatus 10 according to the present invention will be hereinlater described with reference to the drawings shown in FIGS. 1, 4 to 6.

For simplicity and better understanding, it is herein assumed that the function-variable type DSP apparatus 10 is operated to process 10 units of DSP microprogram parts, i.e., DSP microprogram parts 1A to 1J, but of course needless to mention that the number of DSP microprogram parts may be any number.

Figure 4:
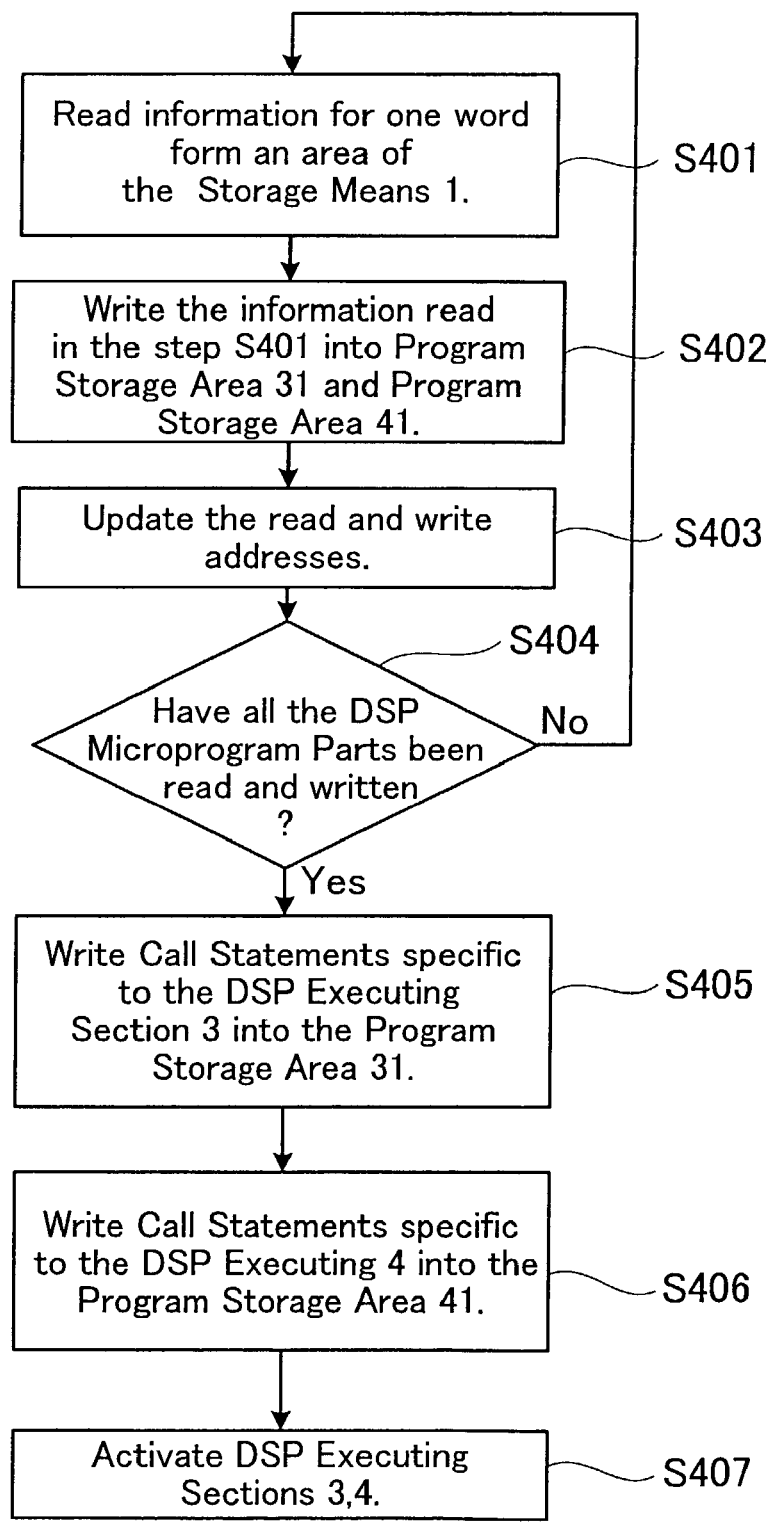
FIG. 4 is a flowchart showing the flows of the initialization process performed by the function-variable type DSP apparatus shown in FIG. 1.
Figure 5:
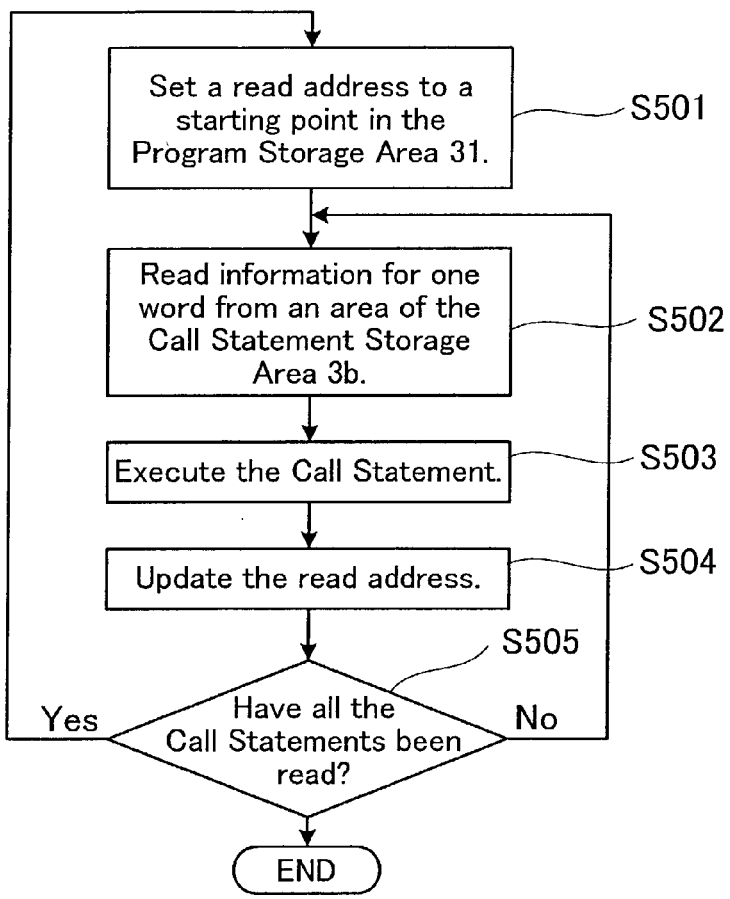
FIG. 5 is a flowchart showing the flows of the DSP operating process performed by the function-variable type DSP apparatus shown in FIG. 1.

The description hereinlater will be directed to the operation of the function-variable type DSP apparatus 10 upon resetting the function-variable type DSP apparatus 10 with reference to the drawings shown in FIGS. 1, 4 and 5.

The operating section 5 is operated to input an operational instruction from, for example, an operator. The control section 2 is operated to receive the operational instruction from the operating section 5, and generate call statements in a sequence each indicative of an instruction to call one of the DSP microprogram parts in accordance with the operational instruction. The call statements are specific to one or more of the DSP executing sections, i.e., the DSP executing sections 3 and 4. The control section 2 is operated to receive DSP microprogram parts, for example, the DSP microprogram parts 1A to 1J from the storage section 1, and transfer the DSP microprogram parts 1A to 1J simultaneously to the DSP executing sections 3 and 4. The control section 2 may receive the DSP microprogram parts from the storage section 1 upon, for example, turning on or resetting the function-variable type DSP apparatus 10. The DSP executing sections 3 and 4 are operated to receive the DSP microprogram parts 1A to 1J simultaneously from the control section 2, store the DSP microprogram parts 1A to 1J in the DSP microprogram part storage areas 3a of the program storage areas 31, 41, and selectively execute the DSP microprogram parts 1A to 1J stored in the DSP microprogram part storage areas 3a of the program storage areas 31, 41 in a sequence to respectively implement desired DSP functions.

The operations of the storage section 1, the control section 2 and the DSP executing sections 3 and 4 will be described in detail with reference to the drawings shown in FIGS. 1 and 4.

The control section 2 is operated to read information for one word from an area of the storage section 1 where the DSP microprogram parts 1A to 1J are stored in the step S401. The term "word" herein used is intended to mean a unit of data storage, and "the information for one word" herein used corresponds to one unit of DSP microprogram part. The area of the storage section 1 which the control section 2 is to read the information from in the step S401 is indicated by a read address. The step S401 goes forward to the step S402 wherein the control section 2 is operated to write the information thus read in the step S401 into the DSP microprogram part storage areas 3a of the program storage area 31 of DSP executing section 3 and program storage area 41 of the DSP executing section 4 simultaneously. The DSP microprogram part storage areas 3a of the of program storage area 31 of DSP executing section 3 and program storage area 41 of the DSP executing section 4 which the control section 2 is operated to write into simultaneously in the step S402 are indicated by write addresses. The step S402 goes forward to the step S403 in which the read and write addresses are updated.

The step S403 goes forward to the step S404 in which the control section 2 is operated to judge whether all the DSP microprogram parts 1A to 1J constituting one DSP microprogram have been read and written. If it is judged that all the DSP microprogram parts 1A to 1J have been read and written in the step S404, the step S404 goes forward to the step S405. Otherwise, the step S404 goes back to the step S401, and the above steps S401 to S403 are repeatedly performed.

In the step S405, the control section 2 is operated to write the call statements specific to the DSP executing section 3 into the call statement storage areas 3b of the program storage area 31 of the DSP executing section 3. The step S405 goes forward to the step S406 in which the control section 2 is operated to write the call statements specific to the DSP executing section 4 into the call statement storage areas 3b of the program storage area 41 of the DSP executing section 4. The step S406, then, goes forward to the step S407 in which the DSP executing sections 3 and 4 are activated. The step S407 goes forward to the step S501.

The operations performed by the storage section 1, the control section 2, and the DSP executing sections 3 and 4 starting from the time point when the function-variable DSP apparatus 10 is reset or turned on until the DSP executing sections 3 and 4 are activated may be referred to as the "initialization operations". Accordingly, the processes from the step S401 to the step S406 corresponding to the initialization operations may be referred to as "initialization process".

The operation of the DSP executing section 3 upon being activated will be described in detail with reference to the drawings shown in FIGS. 1 and 5. The operation of the DSP executing section 4 is identical to that of the DSP executing section 3, and will thus be omitted in description for avoiding tedious repetition.

In the step S501, the DSP executing section 3 is operated to set a read address to a starting point. The read address indicates an area of the call statement storage areas 3b of the program storage area 31 which the DSP executing section 3 is to read information. The step S501 goes forward to the step S502, in which the DSP executing section 3 is operated to read information for one word from an area of the call statement storage areas 3b of the program storage area 31 indicated by the read address. The term "one word" herein used is intended to mean a unit of data storage, and "the information for one word" herein used corresponds to one unit of call statement. The step S502 goes forward to the step S503, in which the DSP executing section 3 is operated to call a DSP microprogram part in response to the call statement read in the step S502 and execute the DSP microprogram part. The step S503 goes forward to the step S504, in which the DSP executing section 3 is operated to update the read address. The step S504 goes forward to the step S505, in which the DSP executing section 3 is operated to judge whether all the call statements have been read or not. If it is judged that all the call statements have been read in the step S505, the step S505 goes forward to END. Otherwise, the step S505 goes back to the step S501 and the above steps S501 to S504 are repeatedly performed. The above steps S501 to S505 may be performed in synchronous with a sampling cycle when the DSP executing section is executing the DSP microprogram parts relating to an audio processing.

According to the present invention, the control section 2 is operative to receive DSP microprogram parts from the storage section 1, and transfer the DSP microprogram parts simultaneously to the DSP executing sections 3, 4 in the first embodiment of the function-variable type DSP apparatus 10. The first embodiment of the DSP apparatus 10 thus constructed makes it possible for the DSP executing sections 3, 4 to simultaneously receive the DSP microprograms respectively, thereby shortening a time required for the DSP executing sections 3, 4 to receive the DSP microprograms and initialize themselves in response to the DSP microprograms thus received, thereby shortening a time to be elapsed before the DSP executing sections 3, 4 implement the desired DSP functions.

In the function-variable type DSP apparatus 10 according to the present invention, any modification may be made to the call statement stored in the call statement storage area 3b of the program storage areas 31, 41 so as to change a DSP function which the function-variable type DSP apparatus 10 implements to a specified DSP function. In the function-variable type DSP apparatus 10 according to the present invention, the operating section 5 may input a modified operational instruction in order to modify a DSP function which the function-variable type DSP apparatus 10 implements to a specified DSP function. The description hereinlater will be directed to the operation of the function-variable type DSP apparatus 10 when any modification is made to the DSP microprogram parts with reference to the drawings shown in FIGS. 1 and 6.

The operating section 5 is operated to input a modified operational instruction. The control section 2 is operated to receive the modified operational instruction from the operating section 5. The control section 2 is then operated to determine one or more addresses respectively corresponding to the DSP microprogram parts to be modified in accordance with the modified operational instruction thus received. The control section 2 is operated to generate call statements in a sequence each indicative of an instruction to call one of the DSP microprogram parts 1A to 1J indicated by the address thus determined, and transfer the call statements thus generated to the DSP executing sections 3, 4. The DSP executing sections 3, 4 are operated to receive the call statements from the control section 2, and selectively execute the DSP microprogram parts stored in the program storage areas 31, 41 in response to the call statements in a sequence to respectively implement desired DSP functions. This means a modification made to the call statements stored in the call statement storage area 3b of the program storage areas 31, 41 enables to modify the DSP microprogram parts which the DSP executing sections 3, 4 execute in a sequence while the DSP microprogram parts remain unchanged in the DSP microprogram part storage area 3a of the of the program storage areas 31, 41.

Figure 6:
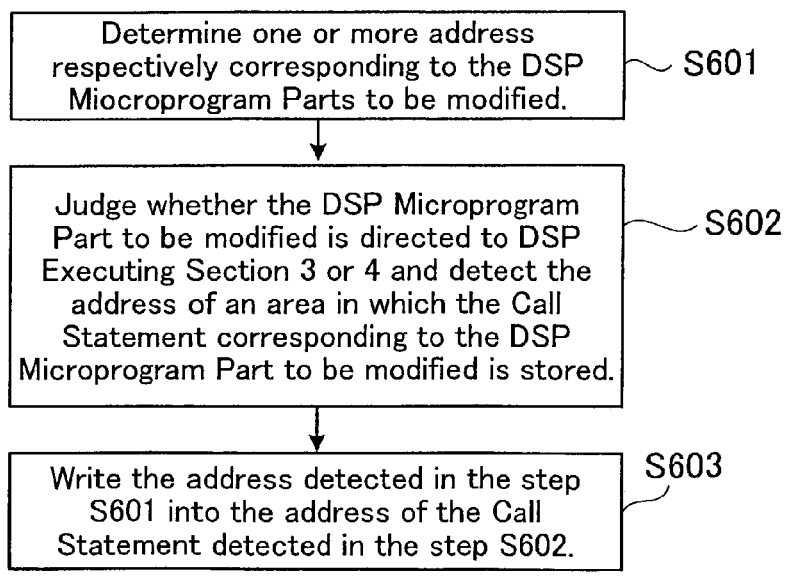
FIG. 6 is a flowchart showing the flows of the call statement modification process performed by the function-variable type DSP apparatus shown in FIG. 1 when any modification is made to a DSP microprogram.

The call statement modification operations of the control section 2, the DSP executing sections 3 and 4, and the operating section 5 will be described in detail with reference to the drawings shown in FIGS. 1 and 6.

The operating section 5 is operative to input a modified operational instruction. The control section 2 is operated to receive the modified operational instruction from the operating section 5 and determine one or more addresses respectively corresponding to the DSP microprogram parts to be modified in accordance with the modified operational instruction in the step S601. The step S601 goes forward to the step S602, in which the control section 2 is operated to judge whether the DSP microprogram part to be modified is directed to DSP executing section 3 or 4, and detect the address of a call statement storage area 3b of the DSP executing section 3 or 4 thus judged in which the call statement corresponding to the microprogram part to be modified is stored. The step S602 goes forward to the step S603, in which the control section 2 is operated to write the address detected in the step S601 into the address of the call statement stored in the call statement storage area 3b of the DSP executing section 3 or 4 detected in the step S602. The call statements are aligned in a sequence as shown in FIG. 3. Thus, the DSP executing sections 3 and 4 are operated to receive the call statements in a sequence from the control section 2, and selectively execute the DSP microprogram parts stored in the program storage areas 31, 41 in response to the call statements in a sequence to respectively implement desired DSP functions. The operations performed by the control section 2, the DSP executing sections 3 and 4, and the operating section 5 so as to modify the call statements may be referred to as the "call statement modification operations". Accordingly, the process from the step S601 to the step S603 corresponding to the call statement modification operations may be referred to as "call statement modification process".

Thus, a modification made to the call statements stored in the call statement storage area 3b of the program storage areas 31, 41 enables to modify the DSP microprogram parts which the DSP executing sections 3, 4 execute, thereby changing a DSP function which the function-variable type DSP apparatus 10 implements to a specified DSP function while the DSP microprogram parts remain unchanged in the DSP microprogram part storage area 3a and a call statement storage area 3b.

As will be seen from the foregoing description, it is to be understood that the first embodiment of the function-variable type DSP apparatus 10 according to the present invention comprising: a storage section 1 for storing a plurality of DSP microprogram parts; and a plurality of DSP executing sections 3, 4 each for executing the DSP microprogram parts to implement a DSP function, each of the DSP microprogram parts being executable by each of the DSP executing sections 3, 4 to perform a set of steps necessary to implement a DSP base function forming part of a DSP function, whereby the DSP executing sections 3, 4 are operative to receive the DSP microprogram parts simultaneously from the storage section 1, and selectively execute the DSP microprogram parts in a sequence to respectively implement desired DSP functions, can reduce a time required for the DSP devices to receive the DSP microprograms respectively from the DSP programming device and initialize themselves in response to the DSP microprograms thus received, thereby shortening a time to be elapsed before the DSP devices implement the desired DSP functions.

Furthermore, the first embodiment of the function-variable type DSP apparatus 10 according to the present invention, which can change a DSP function which the function-variable type DSP apparatus 20 implements to a specified DSP function in a manner that the control section 2 is operative to receive a modified operational instruction from the operating section 5, determine one or more addresses respectively corresponding to the DSP microprogram parts to be modified in accordance with the modified operational instruction received from the operating section 5, generate the call statements in a sequence each indicative of an instruction to call one of the DSP microprogram parts indicated by the address, and transfer the call statements to the DSP executing sections 3, 4, and the DSP executing sections 3, 4 are operative to receive the call statements from the control section 2, and selectively execute the DSP microprogram parts stored in the program storage areas 31, 41 in a sequence in response to the call statements in a sequence to respectively implement desired DSP functions, eliminates the need that the DSP programming device should assemble all of the DSP microprogram parts again to create a modified DSP microprogram to be transferred to the DSP device, and the DSP device should receive the modified DSP microprogram including all of the DSP microprogram parts from the DSP programming device whenever any modification is made to the DSP microprogram parts, thereby shortening a time to be elapsed before the DSP device implements the desired DSP functions.

Though it has been described in the foregoing description that the first embodiment of the function-variable type DSP apparatus 10 comprises two DSP executing sections 3, 4 for the purpose of simplifying the description and assisting in understanding about the whole operation of the function-variable type DSP apparatus 10, it is needless to mention that the function-variable type DSP apparatus 10 may comprise more than two DSP executing sections, or only one DSP executing section.

Figure 8:
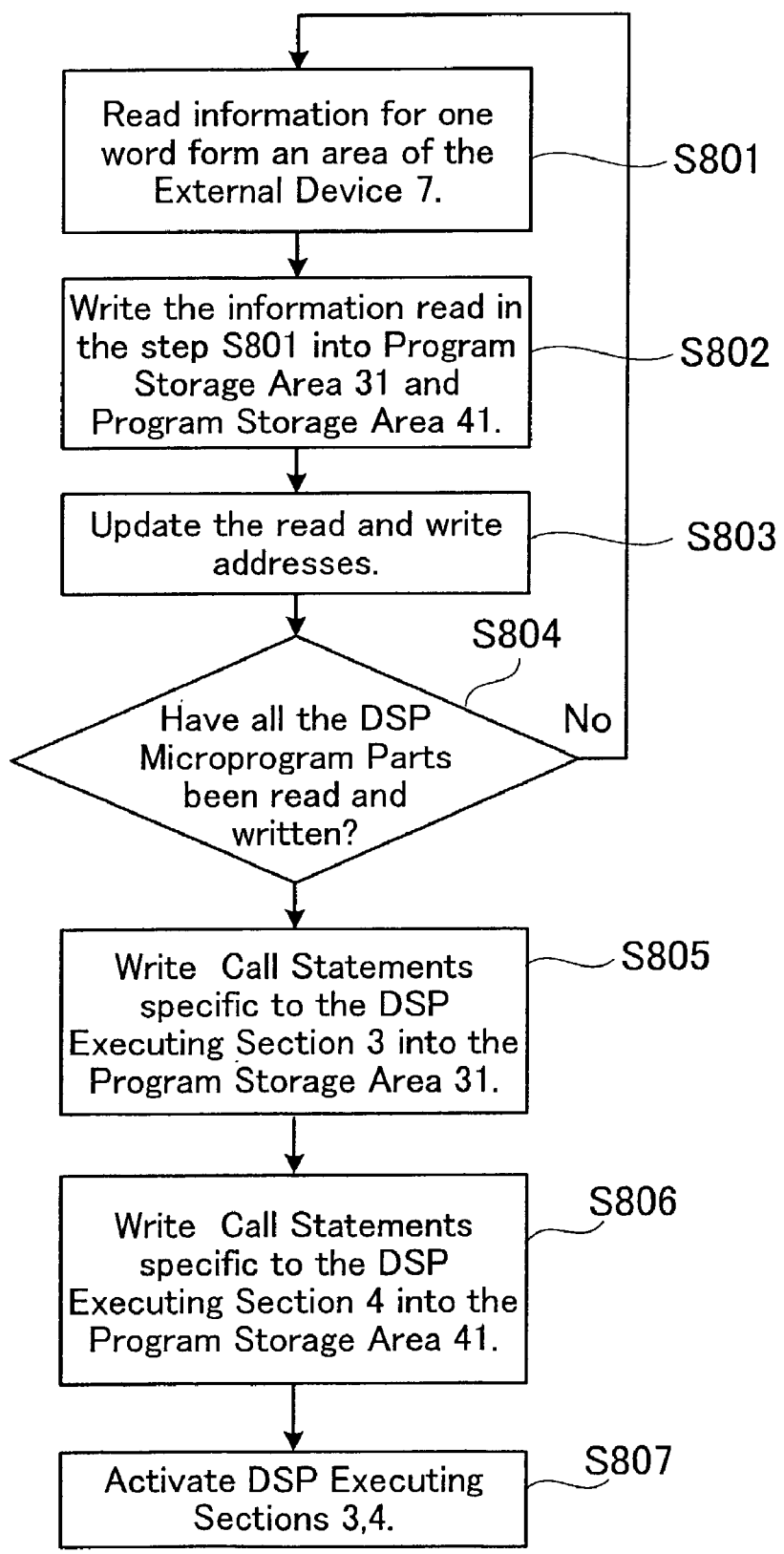
FIG. 8 is a flowchart showing the flows of the initialization process performed by the function-variable type DSP apparatus shown in FIG. 7.
Figure 9:
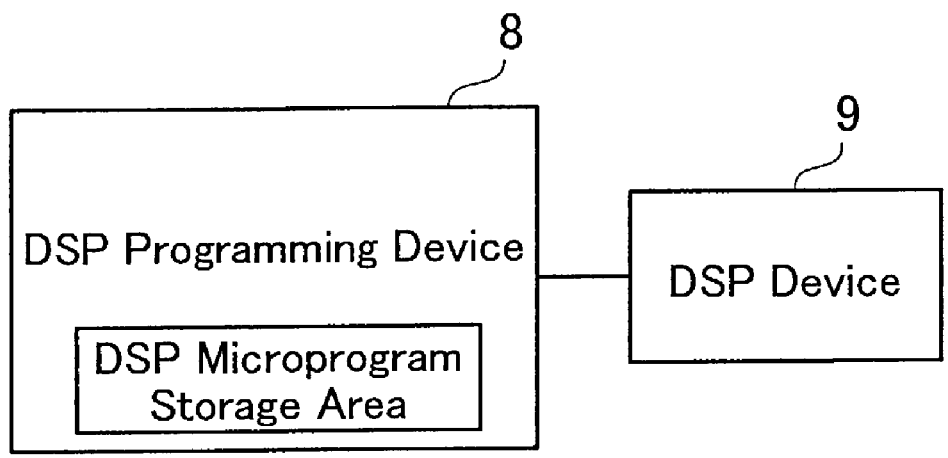
FIG. 9 is a schematic block diagram showing the conventional DSP apparatus.

Referring to FIGS. 7 and 8 of the drawings, there is shown a second preferred embodiment of the function-variable type DSP apparatus 20.

The second preferred embodiment of the function-variable type DSP apparatus 20 is shown in FIG. 7 as comprising: an input section 6, a control section 2, and a plurality of DSP executing sections 3, 4. The second embodiment of the function-variable type DSP apparatus 20 is similar to the first embodiment of the function-variable type DSP apparatus 10 except for the fact that the second embodiment of the function-variable type DSP apparatus 20 comprises an input section 6 in place of the storage section 1. The constitution elements and the steps of the second embodiment of the function-variable type DSP apparatus 20 entirely the same as those of the first embodiment of the function-variable type DSP apparatus 10 will not be described but bear the same reference numerals and legends as those of the first embodiment of the function-variable type DSP apparatus 10 in FIG. 1 to avoid tedious repetition.

The input section 6 is adapted to input a plurality of DSP microprogram parts from, for example, an external device 7. The external device 7 may be, for example, but not limited to, a personal computer or a dedicated storage device placed outside of the function-variable type DSP apparatus 20. Each of the DSP executing sections 3, 4 is adapted to execute the DSP microprogram parts to implement a DSP function. Each of the DSP microprogram parts is executable by each of the DSP executing sections 3, 4 to perform a set of steps necessary to implement a DSP base function forming part of a DSP function. The control section 2 is adapted to receive the DSP microprogram parts from the input section 6, and transfer the DSP microprogram parts simultaneously to the DSP executing sections 3, 4. The DSP executing sections 3, 4 have respectively program storage areas 31, 41, and are operative to receive the DSP microprogram parts simultaneously from the control section 2, store the DSP microprogram parts in the program storage areas 31, 41, and selectively execute the DSP microprogram parts stored in the program storage areas 31, 41 in a sequence to respectively implement desired DSP functions.

The function-variable type DSP apparatus 20 may further comprise: an operating section 5 for inputting an operational instruction from, for example, an external device 7. Alternatively, the input section 6 may serve as an operation section 5. This means that the input section 6 may input an operational instruction from an external device 7.

The operation of the second embodiment of the function-variable type DSP apparatus 20 according to the present invention will be hereinlater described with reference to the drawings shown in FIGS. 7 and 8.

For simplicity and better understanding, it is herein assumed that the function-variable type DSP apparatus 20 is operated to process 10 units of DSP microprogram parts, i.e., DSP microprogram parts 1A to 1J, but of course needless to mention that the number of DSP microprogram parts may be any number.

The description hereinlater will be directed to the operation of the function-variable type DSP apparatus 20 upon resetting the function-variable type DSP apparatus 10 with reference to the drawings shown in FIGS. 7 and 8.

The operating section 5 is operated to input an operational instruction from, for example, an operator. The control section 2 is operated to receive the operational instruction from the operating section 5, and generate call statements in a sequence each indicative of an instruction to call one of the DSP microprogram parts in accordance with the operational instruction. The call statements are specific to one or more of the DSP executing sections, i.e., the DSP executing sections 3 and 4. The input section 6 is operated to receive DSP microprogram parts, for example, the DSP microprogram parts 1A to 1J from the external device 7. The control section 2 is operated to receive the DSP microprogram parts 1A to 1J from the input section 6, and transfer the DSP microprogram parts 1A to 1J simultaneously to the DSP executing sections 3 and 4. The control section 2 may receive the DSP microprogram parts from the input section 6 upon, for example, turning on or resetting the function-variable type DSP apparatus 20. The DSP executing sections 3 and 4 are operated to receive the DSP microprogram parts 1A to 1J simultaneously from the control section 2, store the DSP microprogram parts 1A to 1J in the DSP microprogram part storage areas 3a of the program storage areas 31, 41, and selectively execute the DSP microprogram parts stored in the DSP microprogram part storage areas 3a of the program storage areas 31, 41 in a sequence to respectively implement desired DSP functions.

The operations of the input section 6, the control section 2 and the DSP executing sections 3 and 4 will be described in detail with reference to the drawings shown in FIGS. 7 and 8.

The control section 2 is operated to read information for one word from the input section 6 from an area of the external device 7 where the DSP microprogram parts 1A to 1J are stored in the step S801. The term "word" herein used is intended to mean a unit of data storage, and "the information for one word" herein used corresponds to one unit of DSP microprogram part. The area of the external device 7 which the control section 2 is to read the information from in the step S801 is indicated by a read address. The step S801 goes forward to the step S802 wherein the control section 2 is operated to write the information thus read in the step S801 into the DSP microprogram part storage areas 3*a* of the program storage area 31 of DSP executing section 3 and program storage area 41 of the DSP executing section 4 simultaneously. The DSP microprogram part storage areas 3*a* of the of program storage area 31 of DSP executing section 3 and program storage area 41 of the DSP executing section 4 which the control section 2 is operated to write into simultaneously in the step S802 are indicated by write addresses. The step S802 goes forward to the step S803 in which the read and write addresses are updated.

The step S803 goes forward to the step S804 in which the control section 2 is operated to judge whether all the DSP microprogram parts 1A to 1J have been read and written. If it is judged that all the DSP microprogram parts 1A to 1J have been read and written in the step S804, the step S804 goes forward to the step S805. Otherwise, the step S804 goes back to the step S801, and the above steps S801 to S803 are repeatedly performed.

In the step S805, the control section 2 is operated to write the call statements specific to the DSP executing section 3 into the call statement storage areas 3*b* of the program storage area 31 of the DSP executing section 3. The step S805 goes forward to the step S806 in which the control section 2 is operated to write the call statements specific to the DSP executing section 4 into the call statement storage areas 3*b* of the program storage area 41 of the DSP executing section 4. The step S806, then, goes forward to the step S807 in which the DSP executing sections 3 and 4 are activated.

The operations performed by the input device 6, the control section 2, and the DSP executing sections 3 and 4 starting from the time point when the function-variable DSP apparatus 20 is reset or turned on until the DSP executing sections 3 and 4 are activated may be referred to as the "initialization operations". Accordingly, the processes from the step S4801 to the step S806 corresponding to the initialization operations may be referred to as "initialization process".

Furthermore, any modification may be made to the DSP microprogram parts constituting the DSP microprogram so as to change a DSP function which the function-variable type DSP apparatus 20 implements to a specified DSP function.

The operating section 5 is operative to input a modified operational instruction indicative of DSP microprogram parts to be executed by the DSP executing sections 3, 4 in a sequence. The control section 2 is operative to receive the modified operational instruction from the operating section 5, determine one or more addresses respectively corresponding to the DSP microprogram parts to be modified in accordance with the modified operational instruction received from the operating section 5, generate the call statements in a sequence each indicative of an instruction to call one of the DSP microprogram parts indicated by the address, and transfer the call statements to the DSP executing sections 3, 4. The DSP executing sections 3, 4 are operative to receive the call statements from the control section 2, and selectively execute the DSP microprogram parts stored in the program storage areas 31, 41 in a sequence in response to the call statements in a sequence to respectively implement desired DSP functions.

The operation of the function-variable type DSP apparatus 20 upon the DSP executing sections 3, 4 being activated, and the operation of the function-variable type DSP apparatus 20 when any modification is made to the DSP microprogram parts are the same as those of the first embodiment of the function-variable type DSP apparatus 10, and will thus omitted in description for avoiding tedious repetition.

Though it has been described in the foregoing description that the second embodiment of the function-variable type DSP apparatus 20 comprises two DSP executing sections 3, 4 for the purpose of simplifying the description and assisting in understanding about the whole operation of the function-variable type DSP apparatus 10, it is needless to mention that the function-variable type DSP apparatus 10 may comprise more than two DSP executing sections, or only one DSP executing section.

As will be seen from the foregoing description, it is to be understood that the second embodiment of the function-variable type DSP apparatus 20 according to the present invention comprising: an input section 6 for inputting a plurality of DSP microprogram parts; and a plurality of DSP executing sections 3, 4 each for executing the DSP microprogram parts to implement a DSP function, each of the DSP microprogram parts being executable by each of the DSP executing sections 3, 4 to perform a set of steps necessary to implement a DSP base function forming part of a DSP function, whereby the DSP executing sections 3, 4 are operative to receive the DSP microprogram parts simultaneously from the input section 6, and selectively execute the DSP microprogram parts in a sequence to respectively implement desired DSP functions, can reduce a time required for the DSP devices to receive the DSP microprograms respectively from the DSP programming device and initialize themselves in response to the DSP microprograms thus received, thereby shortening a time to be elapsed before the DSP devices implement the desired DSP functions.

Furthermore, the second embodiment of the function-variable type DSP apparatus 20 according to the present invention, in which the external device 7 is placed outside of the function-variable type DSP apparatus 20, makes it possible for the external device 7 such as, for example, a personal computer to selectively edit specified one or more of the DSP microprogram parts from among all of the DSP microprogram parts, for example, the DSP microprogram parts 1A to 1J, thereby enhancing the convenience of the function-variable type DSP apparatus 20.

In the second embodiment of the function-variable type DSP apparatus 20 according to the present invention, which can change a DSP function which the function-variable type DSP apparatus 20 implements to a specified DSP function in a manner that the control section 2 is operative to receive a modified operational instruction from the operating section 5, determine one or more addresses respectively corresponding to the DSP microprogram parts to be modified in accordance with the modified operational instruction received from the operating section 5, generate the call statements in a sequence each indicative of an instruction to call one of the DSP microprogram parts indicated by the address, and transfer the call statements to the DSP executing sections 3, 4, and the DSP executing sections 3, 4 are operative to receive the call statements from the control section 2, and selectively execute the DSP microprogram parts stored in the program storage areas 31, 41 in a sequence in response to the call statements in a sequence to respectively implement desired DSP functions, any modification made to the call statements stored in the call statement storage area 3*b* of the program storage areas 31, 41 enables to modify the DSP microprogram parts which the DSP executing sections 3, 4 execute while the DSP microprogram parts remain unchanged in the DSP microprogram part storage area 3*a* and a call statement storage area 3*b*. The second embodiment of the function-variable type DSP apparatus 20 thus constructed can eliminate the need that the DSP programming device should assemble all of the DSP microprogram parts again to create a modified DSP microprogram to be transferred to the DSP device, and the DSP device should receive the modified DSP microprogram including all of the DSP microprogram parts from the DSP programming device whenever any modification is made to the DSP microprogram parts, thereby shortening a time to be elapsed before the DSP device implements the desired DSP functions.

According to the present invention, all the functions of the above embodiments of the function-variable type DSP apparatus may be performed by a computer comprising a central processing unit, hereinlater referred to as a "CPU", a sound device such as a sound card, and computer usable storage medium such as a floppy disk, a CD-ROM, a DVD-ROM, a hard disk, and so on, having computer readable code embodied therein for executing all of the functions of the aforesaid constituent elements of the above embodiments of the function-variable type DSP apparatus. The computer may be a microcomputer, the other computer, a device comprising a microcomputer, or the like.

While the invention has been shown and described with respect to particular embodiments thereof, this is for the, purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A function-variable type DSP apparatus comprising:
   a storage section for storing a plurality of DSP microprogram parts;
   a plurality of DSP executing sections each for executing said DSP microprogram parts to implement a DSP function, each of said DSP microprogram parts being executable by each of said DSP executing sections to perform a set of steps necessary to implement a DSP base function forming part of a DSP function;
   a control section for receiving said DSP microprogram parts from said storage section, and transferring said DSP microprogram parts simultaneously to said DSP executing sections, and
   an operating section for inputting an operational instruction, and in which
   said DSP executing sections have respectively program storage areas, and are operative to receive said DSP microprogram parts simultaneously from said control section, store said DSP microprogram parts in said program storage areas, and selectively execute said DSP microprogram parts stored in said program storage areas in a sequence to respectively implement desired DSP functions,
   said control section is operative to receive said operational instruction from said operating section, generate call statements in a sequence each indicative of an instruction to call one of said DSP microprogram parts in accordance with said operational instruction, and transfer said call statements to said DSP executing sections, said DSP executing sections are operative to receive said call statements from said control section, and selectively execute said DSP microprogram parts stored in said program storage areas in a sequence in response to said call statements in a sequence to respectively implement desired DSP functions,
   each of said DSP microprograms corresponds to an address, said operating section is operative to input a modified operational instruction indicative of DSP microprogram parts to be executed by said DSP executing sections in a sequence,
   said control section is operative to receive said modified operational instruction inputted by said operating section, determine one or more addresses respectively corresponding to said DSP microprogram parts to be modified in accordance with said modified operational instruction inputted by said operating section, generate said call statements in a sequence each indicative of an instruction to call one of said DSP microprogram parts indicated by said address, and transfer said call statements to said DSP executing sections, and
   said DSP executing sections are operative to receive said call statements from said control section, and selectively execute said DSP microprogram parts stored in said program storage areas in a sequence in response to said call statements in a sequence to respectively implement desired DSP functions.

2. A function-variable type DSP apparatus as set forth in claim 1, in which said input section serves as said operating section.

3. A function-variable type DSP apparatus comprising:
   an input section for inputting a plurality of DSP microprogram parts;
   a plurality of DSP executing sections each for executing said DSP microprogram parts to implement a DSP function, each of said DSP microprogram parts being executable by each of said DSP executing sections to perform a set of steps necessary to implement a DSP base function forming part of a DSP function; and
   a control section for receiving said DSP microprogram parts from said input section, and transferring said DSP microprogram parts simultaneously to said DSP executing sections, and
   an operating section for inputting an operational instruction, and in which
   said DSP executing sections have respectively program storage areas, and are operative to receive said DSP microprogram parts simultaneously from said control section, store said DSP microprogram parts in said program storage areas, and selectively execute said DSP microprogram parts stored in said program storage areas in a sequence to respectively implement desired DSP functions,
   said control section is operative to receive said operational instruction from said operating section, generate call statements in a sequence each indicative of an instruction to call one of said DSP microprogram parts in accordance with said operational instruction, and transfer said call statements to said DSP executing sections, said DSP executing sections are operative to receive said call statements from said control section and selectively execute said DSP microprogram parts stored in said program storage areas in a sequence in response to said call statements in a sequence to respectively implement desired DSP functions,
   each of said DSP microprograms corresponds to an address, said operating section is operative to input a modified operational instruction indicative of DSP microprogram parts to be executed by said DSP executing sections in a sequence, said control section is operative to receive said modified operational instruction inputted by said operating section, determine one or more addresses respectively corresponding to said DSP microprogram parts to be modified in accordance with said modified operational instruction inputted by said operating section, generate said call statements in a sequence each indicative of an instruction to call one of said DSP microprogram parts indicated by said address, and transfer said call statements to said DSP executing sections, and said DSP executing sections are operative to receive said call statements from said control section, and selectively execute said DSP microprogram parts stored in said program storage areas in a sequence in response to said call statements in a sequence to respectively implement desired DSP functions.

4. A function-variable type DSP apparatus as set forth in claim 3, in which said input section serves as said operating section.

5. A function-variable type DSP method comprising:

a step (a) of storing a plurality of DSP microprogram parts in a storage section;

a plurality of steps (b-1 to b-n) each executing said DSP microprogram parts to implement a DSP function, each of said DSP microprogram parts being executable by each of said steps (b-1 to b-n) to perform a set of steps necessary to implement a DSP base function forming part of a DSP function;

a step (c) of receiving said DSP microprogram parts from said storage section, and transferring said DSP microprogram parts simultaneously to said steps (b-1 to b-n), and a step (d) of inputting an operational instruction, and in which said steps (b-1 to b-n) have respectively steps of receiving said DSP microprogram parts simultaneously transferred in said step (c), storing said DSP microprogram parts in respective program storage areas, and selectively executing said DSP microprogram parts stored in said program storage areas in a sequence to respectively implement desired DSP functions, said step (c) has a step of receiving said operational instruction inputted in said step (d), generating call statements in a sequence each indicative of an instruction to call one of said DSP microprogram parts in accordance with said operational instruction, and transfer said call statements to said steps (b-1 to b-n), said steps (b-1 to b-n) have respectively steps of receiving said call statements transferred in said step (c), and selectively executing said DSP microprogram parts stored in said program storage areas in a sequence in response to said call statements in a sequence to respectively implement desired DSP functions, each of said DSP microprograms corresponds to an address, said step (d) has a step of inputting a modified operational instruction indicative of DSP microprogram parts to be executed in said steps (b-1 to b-n) in a sequence, and said step (c) has a step of receiving said modified operational instruction inputted in said step (d), determining one or more addresses respectively corresponding to said DSP microprogram parts to be modified in accordance with said modified operational instruction inputted in said step (d), generating said call statements in a sequence each indicative of an instruction to call one of said DSP microprogram parts indicated by said address, and transferring said call statements to said steps (b-1 to b-n), said steps (b-1 to b-n) have respectively steps of receiving said call statements transferred in said step (c), and selectively executing said DSP microprogram parts stored in said program storage areas in a sequence in response to said call statements in a sequence to respectively implement desired DSP functions.

6. A function-variable type DSP method comprising:

a step (e) of inputting a plurality of DSP microprogram parts;

a plurality of steps (b-1 to b-n) each executing said DSP microprogram parts to implement a DSP function, each of said DSP microprogram parts being executable by each of said steps (b-1 to b-n) to perform a set of steps necessary to implement a DSP base function forming part of a DSP function;

a step (c) of receiving said DSP microprogram parts inputted in said step (e), and transferring said DSP microprogram parts simultaneously to said steps (b-1 to b-n), and a step (d) of inputting an operational instruction, and in which said steps (b-1 to b-n) have respectively steps of receiving said DSP microprogram parts simultaneously transferred in said step (c), storing said DSP microprogram parts in program storage areas, and selectively executing said DSP microprogram parts stored in said program storage areas in a sequence to respectively implement desired DSP functions, said step (c) has a step of receiving said operational instruction inputted in said step (d), generating call statements in a sequence each indicative of an instruction to call one of said DSP microprogram parts in accordance with said operational instruction, and transferring said call statements to said steps (b-1 to b-n)

said steps (b-1 to b-n) have respectively steps of receiving said call statements transferred in said step (c), and selectively executing said DSP microprogram parts stored in said program storage areas in a sequence in response to said call statements in a sequence to respectively implement desired DSP functions, each of said DSP microprograms corresponds to an address, said step (d) has a step of inputting a modified operational instruction indicative of DSP microprogram parts to be executed in said steps (b-1 to b-n) in a sequence, said step (c) has a step of receiving said modified operational instruction inputted in said step (d), determining one or more addresses respectively corresponding to said DSP microprogram parts to be modified in accordance with said modified operational instruction inputted in said step (d), generating said call statements in a sequence each indicative of an instruction to call one of said DSP microprogram parts indicated by said address, and transferring said call statements to said steps (b-1 to b-n), said steps (b-1 to b-n) have respectively steps of receiving said call statements transferred in said step (c), and selectively executing said DSP microprogram parts stored in said program storage areas in a sequence in response to said call statements in a sequence to respectively implement desired DSP functions.

7. A function-variable type DSP computer program product comprising:
- a computer readable program code (a) for storing a plurality of DSP microprogram parts in a storage section;
- a plurality of computer readable program codes (b-1 to b-n) each for executing said DSP microprogram parts to implement a DSP function, each of said DSP microprogram parts being executable by each of said computer readable program codes (b-1 to b-n) to perform a set of steps necessary to implement a DSP base function forming part of a DSP function;
- a computer readable program code (c) for receiving said DSP microprogram parts from said storage section, and transferring said DSP microprogram parts simultaneously to said computer readable program codes (b-1 to b-n),
- a computer readable program code (d) for inputting an operational instruction, and in which
- said computer readable program codes (b-1 to b-n) have respectively computer readable program codes for receiving said DSP microprogram parts simultaneously transferred by said computer readable program code (c), storing said DSP microprogram parts in respective program storage areas, and selectively executing said DSP microprogram parts stored in said program storage areas in a sequence to respectively implement desired DSP functions,
- said computer readable program code (c) has a computer readable program code for receiving said operational instruction inputted by said computer readable program code (d), generating call statements in a sequence each indicative of an instruction to call one of said DSP microprogram parts in accordance with said operational instruction, and transfer said call statements to said computer readable program codes (b-1 to b-n),
- said computer readable program codes (b-1 to b-n) have respectively computer readable program codes for receiving said call statements transferred by said computer readable program code (c), and selectively executing said DSP microprogram parts stored in said program storage areas in a sequence in response to said call statements in a sequence to respectively implement desired DSP functions,
- each of said DSP microprograms corresponds to an address, said computer readable program code (d) has a computer readable program code for inputting a modified operational instruction indicative of DSP microprogram parts to be executed by said computer readable program codes (b-1 to b-n) in a sequence,
- said computer readable program code (c) has a computer readable program code for receiving said modified operational instruction inputted by said computer readable program code (d) determining one or more addresses respectively corresponding to said DSP microprogram parts to be modified in accordance with said modified operational instruction inputted by said computer readable program code (d), generating said call statements in a sequence each indicative of an instruction to call one of said DSP microprogram Parts indicated by said address, and transferring said call statements to said computer readable program codes (b-1 to b-n), and
- said computer readable program codes (b-1 to b-n) have respectively computer readable program codes for receiving said call statements transferred by said computer readable program code (c), and selectively executing said DSP microprogram parts stored in said program storage areas in a sequence in response to said call statements in a sequence to respectively implement desired DSP functions.

8. A function-variable type DSP computer program product comprising:
- a computer readable program code (e) for inputting a plurality of DSP microprogram parts;
- a plurality of computer readable program codes (b-1 to b-n) each for executing said DSP microprogram parts to implement a DSP function, each of said DSP microprogram parts being executable by each of said computer readable program codes (b-1 to b-n) to perform a set of steps necessary to implement a DSP base function forming part of a DSP function;
- a computer readable program code (c) for receiving said DSP microprogram parts inputted by said computer readable program code (e), and transferring said DSP microprogram parts simultaneously to said computer readable program codes (b-1 to b-n),
- a computer readable program code (d) for inputting an operational instruction, and in which
- said computer readable program codes (b-1 to b-n) have respectively computer readable program codes for receiving said DSP microprogram parts simultaneously transferred by said computer readable program code (c), storing said DSP microprogram parts in program storage areas, and selectively executing said DSP microprogram parts stored in said program storage areas in a sequence to respectively implement desired DSP functions,
- said computer readable program code (c) has a computer readable program code for receiving said operational instruction inputted by said computer readable program code (d), generating call statements in a sequence each indicative of an instruction to call one of said DSP microprogram parts in accordance with said operational instruction, and transferring said call statements to said computer readable program codes (b-1 to b-n),
- said computer readable program codes (b-1 to b-n) have respectively computer readable program codes for receiving said call statements transferred by said computer readable program code (c), and selectively executing said DSP microprogram parts stored in said program storage areas in a sequence in response to said call statements in a sequence to respectively implement desired DSP functions,
- each of said DSP microprograms corresponds to an address, said computer readable program code (d) has a computer readable program code for inputting a modified operational instruction indicative of DSP microprogram parts to be executed by said computer readable program codes (b-1 to b-n) in a sequence, said computer readable program code (c) has a computer readable program code for receiving said modified operational instruction inputted by said computer readable program code (d), determining one or more addresses respectively corresponding to said DSP microprogram parts to be modified in accordance with said modified operational instruction inputted by said computer readable program code (d), generating said call statements in a sequence each indicative of an instruction to call one of said DSP microprogram parts indicated by said address, and transferring said call statements to said computer readable program codes (b-1 to b-n), and said computer readable program codes (b-1 to b-n) have respectively computer readable program codes for receiving said call statements transferred by said computer readable program code (c), and selectively executing said DSP microprogram parts stored in said program storage areas in a sequence in response to said call statements in a sequence to respectively implement desired DSP functions.

* * * * *